United States Patent
Lai

(10) Patent No.: US 11,133,842 B1
(45) Date of Patent: Sep. 28, 2021

(54) POWER LINE COMMUNICATION SENDER AND RECEIVER

(71) Applicant: POWER MOS ELECTRONICS LIMITED, Kowloon (CN)

(72) Inventor: Cheng-Chang Lai, Taipei (TW)

(73) Assignee: POWER MOS ELECTRONICS LIMITED, Hong Kong (CN)

( * ) Notice: Subject to any disclaimer, the term of this patent is extended or adjusted under 35 U.S.C. 154(b) by 0 days.

(21) Appl. No.: 16/994,054

(22) Filed: Aug. 14, 2020

(51) Int. Cl.
*H05B 47/185* (2020.01)
*H04B 3/54* (2006.01)

(52) U.S. Cl.
CPC ............ *H04B 3/54* (2013.01); *H05B 47/185* (2020.01)

(58) Field of Classification Search
CPC .......... G01R 31/00; H04B 3/54; H04B 3/542; H04L 25/02; H04L 27/02; H04L 27/06; H05B 33/08; H05B 37/02; H05B 37/03; H05B 45/20; H05B 45/44; H05B 47/165; H05B 47/185
USPC ........ 307/1, 3; 315/130, 152, 201, 294, 307; 375/219, 257, 259, 295, 316
See application file for complete search history.

(56) References Cited

U.S. PATENT DOCUMENTS

| | | | |
|---|---|---|---|
| 9,900,963 B1* | 2/2018 | Doll ..................... | H05B 45/10 |
| 2014/0093002 A1* | 4/2014 | Lekatsas ............... | H04B 3/548 |
| | | | 375/259 |
| 2016/0198551 A1* | 7/2016 | Kelly ................... | H05B 45/3725 |
| | | | 315/291 |
| 2017/0064794 A1* | 3/2017 | Park ..................... | H04B 3/548 |

* cited by examiner

*Primary Examiner* — Shawkat M Ali
(74) *Attorney, Agent, or Firm* — Birch, Stewart, Kolasch & Birch, LLP

(57) ABSTRACT

A power line communication sender generates a command signal that comprises a series of alternate first level voltage signals and second level voltage signals, while the time periods of each first level voltage signal and each second level voltage signal are determined according to the value of each corresponding bit in a command information. A power line communication receiver is connected to the sender through power lines to receive power and command signals. When the receiver receives the command signal, the time periods of each first level voltage signal and second level voltage signal is calculated to record each bits of the command signal. Since the information is carried in every first level voltage signal and second level voltage signal, it requires only half the time and requires no quick switching in every binary bit of the transmitted signal, therefore efficiency is improved and signal distortion is lowered.

5 Claims, 3 Drawing Sheets

POWER LINE COMMUNICATION SENDER AND RECEIVER

BACKGROUND OF THE INVENTION

1. Field of the Invention

The present invention relates to a sender and a receiver, particularly to a sender and a receiver for power line carried signal communication.

2. Description of the Related Art

A lighting system usually includes a control module and multiple lighting devices. The lighting devices are electrically connected to the control module to be controlled respectively. The communication between the control module and the lighting devices may be established on a specific communication protocol, for example, a control signal sent by the control module may comprises address code and lighting command code, such that the control signal may be recognized and performed by the designated lighting device.

A method for carrying signal control on power line is a technique that transmit the control signal through the power line, so that no extra signal line is needed. In order to do this, a binary signal carried on the power line comprises of low level voltage signal and high level voltage signal, wherein the low level voltage signal is high enough to maintain the operation of the processor chip in the lighting devices, and the high level voltage signal is high enough to provide power of the lighting devices to light in all color and lightness. The defining of the binary codes by combining the low level voltage signal and high level voltage signal needs to consider both flicker frequency of the lighting devices and EMI problem.

There are several different protocols commonly used to define the binary control signals on power line. With reference to FIG. 4, another method commonly used is to define the bit by the time between two successive rising edges. For example, a "0" bit is defined by time period T0 between the first and the second rising edges, and a "1" bit is defined by time period T1 between the second and the third rising edges. To provide the rising edges, a falling edge from the high level voltage signal comes shortly before every rising edge. This method ensures that the proportion of high level voltage signal is enough to provide stable power to the LED devices. However, each bit transmitted requires two short timed switching. In the example of FIG. 4, the transmitting of a 5-bit signal requires 11 switching. This method causes high EMI and signal distortion, which makes it difficult to transmit the signals to lighting devices far away in the system.

With reference to FIG. 5, a method is to define the bit by the time period of the low level voltage signal, for example, a "0" bit is transmitted by a time period T0 of low level voltage signal, and a "1" bit is transmitted by a time period T1 of low level voltage signal, while T0≠T1. However, in order to ensure the power transmitted is sufficient to drive the lighting devices normally and avoid flickering caused by long time low level voltage signal, each low level voltage signal is followed with a high level voltage signal of the same length. Namely, every time period T0 of low level voltage signal is followed by a time period Td0, and the time period T1 of low level voltage signal is followed by a time period Td1 of high level voltage signal, while T0=Td0 and T1=Td1, as shown in FIG. 5. However, this means every bit transmitted requires doubled time than the time that actually contains information. In the example of FIG. 5, assuming T0=Td0=3 μs and T1=Td1=6 μs, the transmitting of a 5-bit signal "01011" requires a total of 48 μs. This method causes low efficiency and low frames per second (FPS).

Therefore, the method for carrying signal control on power line is needed to be improved.

SUMMARY OF THE INVENTION

The present invention provides a power line communication sender, wherein the command signal comprises a series of alternate first level voltage signal and second level voltage signal, and the time period of each first level voltage signal and each second level voltage signal are determined according to the value of each corresponding bit in the command information.

The command information includes a series of first values and second values, that is, "0"s and "1"s. In the command signal that carries the command information, each "0" or "1" is represented by a time period of each low or high level voltage signal. For example, the first two bits of the command information is "01". A first level voltage signal is meant to represent the first value "0", therefore the first level voltage signal has a first time period; the following second level voltage signal is to represent the second value "1", therefore the following second level voltage signal has a second time period after the first time period.

In the present invention, each binary bit may be represented by the time period of each square wave formed with either the first level voltage signal or the second level voltage signal, and the value ("0" or "1") of each is determined according to the time period of each first level voltage signal or the second level voltage signal.

The present invention also provides a power line communication receiver, connected to the power line communication sender through power lines to receive power and command signals. When the power line communication receiver receives the command signal from the power line communication sender, the power line communication receiver calculates the time periods of each first level voltage signal and each second level voltage signal, and records each bits according to the time period of each first level voltage signal and second level voltage signal.

Since the information is carried in every first level voltage signal and second level voltage signal, rather only the low level voltage signal that needs to be pared with a high level voltage signal with same time period to ensure the output power, the present invention requires only half the time to transmit the same amount of information compared to the conventional method described in FIG. 5. Furthermore, a first level voltage signal and a following second voltage is connected with a rising edge or a falling edge, depending on the relative high/low relation between the first and second level voltage signal. Namely, every bit requires only one rising/falling edge to switch to the next bit, and requires no quick switching in every binary bit of the transmitted signal. Therefore the effect signal distortion or EMI may be lowered.

To sum up, the present invention provides a sender and a receiver implementing a new physical layer communication protocol for power line carry signal technique to transmit the information in binary bits. The required time to transmit the same information is lowered, and no high-speed switching is required. With the aforementioned advantages, the data density and transmission distance may be improved at the same time.

DETAILED DESCRIPTION OF THE INVENTION

Figure 1:
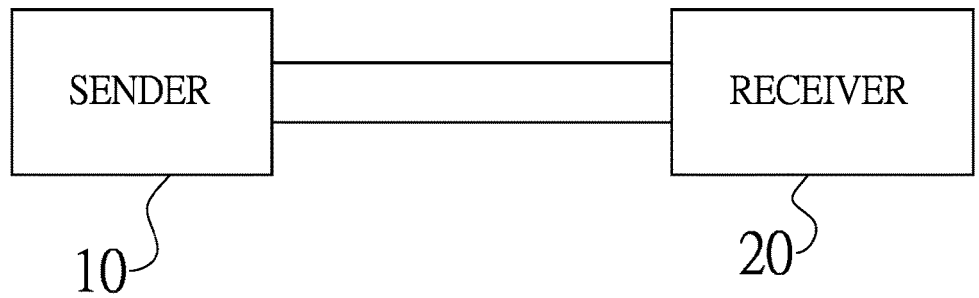
FIG. 1 is a block diagram of the sender and receiver of the present invention.
Figure 2:
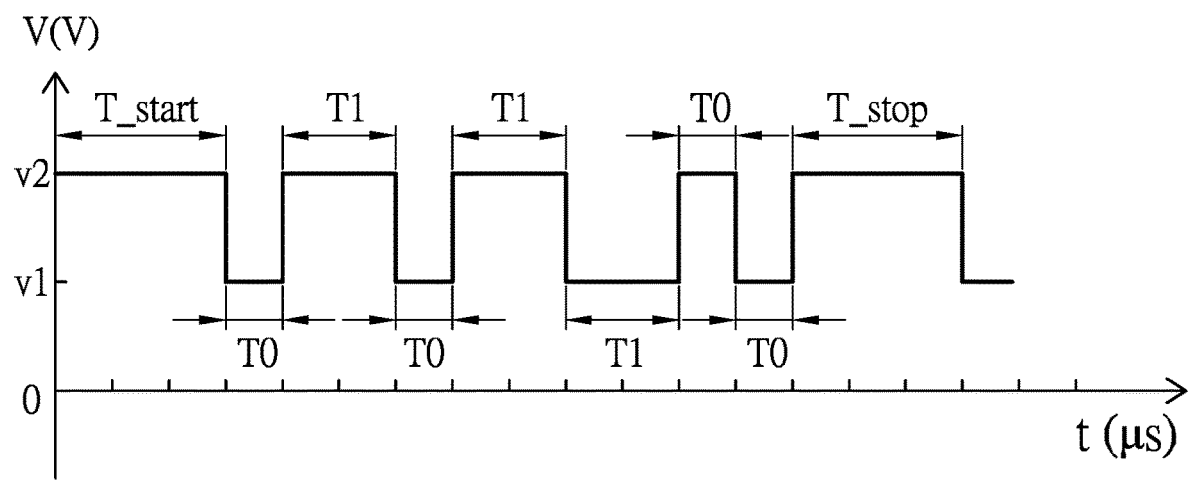
FIG. 2 is a waveform diagram of a power line carry signal technique of the present invention.
Figure 3:
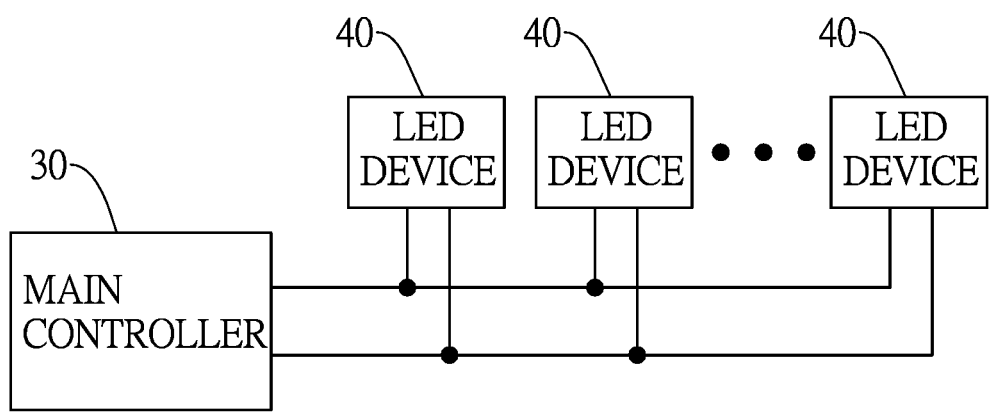
FIG. 3 is a block diagram of an embodiment of the present invention.
Figure 4:
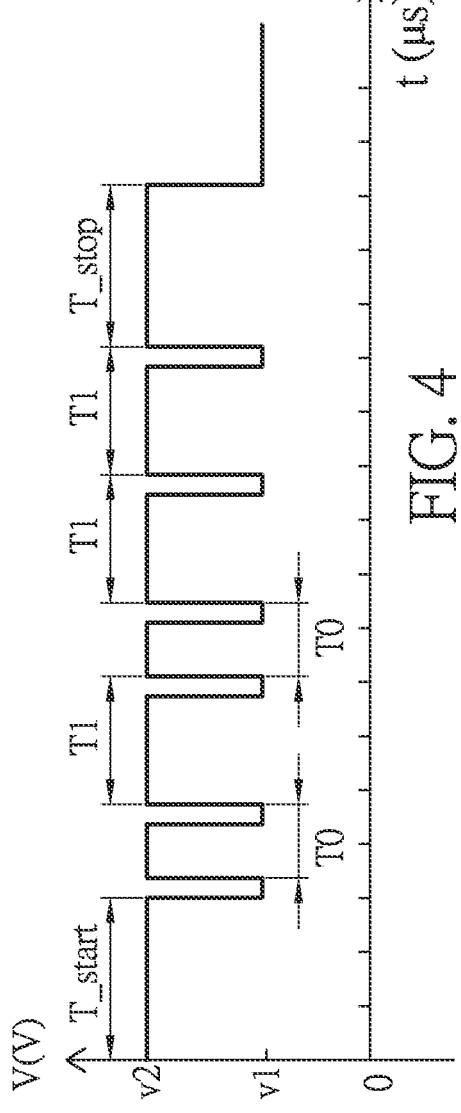
FIG. 4 is a waveform diagram of a conventional power line carry signal technique.
Figure 5:
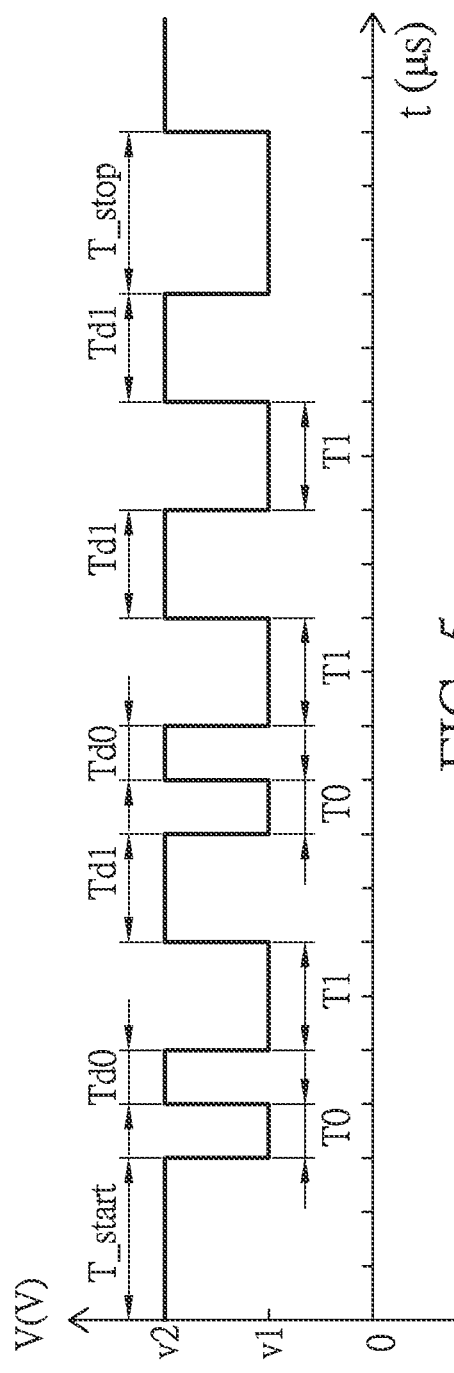
FIG. 5 is a waveform diagram of another conventional power line carry signal technique.

With reference to FIGS. 1 and 2, the present invention provides a power line communication sender 10 that generates a command signal according to the command information having multiple bits. The command signal carries the command information with a series of alternative first level voltage signal and second level voltage signal, in which the time period of each first level voltage signal or second level voltage signal stands for a bit in the command information.

In an embodiment, when the value of the first bit is a first value, the time period of the first level voltage signal corresponding to the first bit is a first time period; when the value of the first bit is a second value, the time period of the first level voltage signal corresponding to the first bit is a second time period; when the value of the second bit is the first value, the time period of the second level voltage signal corresponding to the second bit is a first time period; when the value of the second bit is the second value, the time period of the first level voltage signal corresponding to the second bit is a second time period.

In an embodiment, when the first time period is Aµs, the second time period may be 2Aµs, and a tail square wave signal T_stop may have a time period of 4A. Therefore, if a time period of a first level voltage signal or a second level voltage signal is the first time period, for example, 3 µs, it stands for the first value, for example, "0"; if a time period of a first level voltage signal or a second level voltage signal is, for example, 6 µs, it stands for a second value, for example, "1", and if a time period of a first level voltage signal or a second level voltage signal is, for example, 12 µs, it indicates the end of the command signal.

Therefore, when the sender 10 sends a first bit of the command information in the command signal, the sender 10 outputs a first level voltage signal, when the sender 10 sends a second bit of the command information which follows the first bit in the command signal, the sender 10 switches to output a second level voltage signal, when the sender 10 sends third bit of the command information, the sender 10 switches back to outputting the first level voltage signal, and so on. The time period of either the first level voltage signal or the second level voltage signal is determined according to the corresponding first bit, second bit, or the third bit.

With reference to FIG. 2, an example command information has a binary code "0101100" with 7 bits. The first level voltage signal is assumed to be a low level voltage signal (0.5V), and the second level voltage signal is assumed to be a high level voltage signal (0.8V). In an embodiment, the command signal further includes a header square wave signal T_start which may be formed with a high level voltage signal that a time period of the header square wave signal lasts for a third time period, for example, 9 µs, and a tail square wave signal T_stop with a high level voltage signal or a low level voltage signal that a time period of the tail square wave signal lasts fourth time period, for example 12 µs. After an initial header square wave signal T_start of 0.8V, the first bit of the command information "0" is outputted with 3 µs of first level voltage signal 0.5V, the second bit of the command information "1" is outputted with 6 µs of second level voltage signal 0.8V, the third bit of the command information "0" is outputted with 3 µs of first level voltage signal 0.5V, the fourth bit of the command information "1" is outputted with 6 µs of second level voltage signal 0.8V, and the fifth bit of the command information "1" is outputted with 6 µs of second level voltage signal 0.8V, the sixth bit of the command information "0" is outputted with 3 µs of first level voltage signal 0.5V, and the seventh bit of the command information "0" is outputted with 3 µs of second level voltage signal 0.8V. Finally, the command signal is ended with the tail square wave signal T_stop of 12 µs.

In this example, the transmitting of 7-bit signal "0101100" requires only 30 µs and 7 switching, which clearly reduces both the transmitting time and switching times.

A power line communication receiver 20 in the present invention is also described herein. The receiver 20 is electrically connected to the sender 10 through power lines, and receives the command signal from the sender 10. The receiver 20 calculates the time period of each first level voltage signal and second level voltage signal, and records each corresponding bits according to the time period of each first level voltage signal and second level voltage signal.

That is, when the time period of the first level voltage signal or the second level voltage signal is a first time period, the power line communication receiver 20 records a first value; when the time period of the first level voltage signal or the second level voltage signal is a second time period, the power line communication receiver 20 records a second value.

To be more specific, the receiver 20 detects each falling and rising edge, calculates the time interval between a rising/falling edge and the successive falling/rising edge, which is a time period of a first level voltage signal or a second level voltage signal, and records the binary bit according to the time period. For example, if the time period between a rising/falling edge and the successive falling/rising edge is the first time period, the receiver 20 records a first value, perhaps a "0"; if the time period between a rising/falling edge and the successive falling/rising edge is the second time period, the receiver 20 records a second value, perhaps a "1".

In an embodiment of the present invention, the sender 10 may be a main controller 30 of a light-emitting diode (LED) lighting system, and the receiver 20 is the LED device 40 of the LED lighting system. The LED lighting system may include multiple LED device 40s, and the LED device 40s are connected in parallel to the power lines. The command information of the main controller 30 may include an address code and a lighting code. The main controller 30, as the sender 10, generates the command signal in the order of: a header code, the address code, the lighting code, and a tail code. The header code corresponds to sending the header square wave signal, and the tail code corresponds to sending the tail square wave signal. The LED device 40 may include a processor unit, a memory unit and a LED unit, the memory unit is connected to the processor unit and stores an identity code of the LED device 40. When the LED device 40s receive the command signal, each processor unit records the address code and the lighting code containing in the command signal, checks if the address code corresponds to an identity code stored in it's own memory unit. If the address code corresponds to an identity code, the LED device 40 acknowledges the lighting code and controls the lighting accordingly.

For example, the address code may be an 8-bit address code to present 256 different addresses, or a 9-bit address code to present 512 different addresses, and the main controller 30 may control 256 or 512 LED device 40s individually. The lighting code may include an 8-bit dimming code to represent a 256 grey-scale for each of a red LED unit, a blue LED unit, and a green LED unit.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A Power Line Communication (PLC) comprising
   a PLC sender configured to generate a command signal according to a command information having multiple bits, wherein the command signal comprises a series of alternate first level voltage signals and second level voltage signals, and time periods of each first level voltage signal and each second level voltage signal are determined according to values of different bits in the command information, and
   wherein:
   when the PLC sender sends a first bit of the command information in the command signal, the PLC sender outputs the first level voltage signal,
   when the PLC sender sends a second hit of the command information following the first bit in the command signal, the PLC sender outputs the second level voltage signal,
   a time period of the first level voltage signal corresponding to the first bit is determined according to a value of the first bit, and a time period of the second level voltage signal corresponding to the second hit is determined according to a value of the second bit,
   when the value of the first bit is a first value "0" the time period of the first level voltage signal corresponding to the first bit is a first time period,
   when the value of the first bit is a second value "1", the time period of the first level voltage signal corresponding to the first bit is a second time period,
   when the value of the second bit is the first value "0", the time period of the second level voltage signal corresponding to the second bit is the first time period, and
   when the value of the second bit is the second value "1", the time period of the first level voltage signal corresponding to the second bit is the second time period.

2. The PLC sender as claimed in claim 1, wherein the command signal further comprises:
   a header square wave signal, wherein a time period of the header square wave signal is a third time period; and
   a tail square wave signal, wherein a time period of the tail square wave signal is a fourth time period, wherein the third time period and the fourth time period are different to the first time period and the second time period.

3. The PLC sender as claimed in claim 2, wherein the first level voltage signal is a low level voltage signal and the second level voltage signal is a high level voltage signal.

4. The PLC sender as claimed in claim 2, wherein:
   the PLC sender is a main controller of a lighting system, and the command information includes an address code and a lighting code; and
   the PLC sender generates the command signal according to the command information in the order of: a header code, the address code, the lighting code, and a tail code.

5. The PLC sender as claimed in claim 1, wherein:
   the PLC sender is a main controller of a lighting system, and the command information includes an address code and a lighting code; and
   the PLC generates the command signal according to the command information in the order of: a header code, the address code, the lighting code, and a tail code.

* * * * *